(12) United States Patent
Pasternack

(10) Patent No.: US 11,403,463 B2
(45) Date of Patent: Aug. 2, 2022

(54) LANGUAGE PROFICIENCY INFERENCE SYSTEM

(71) Applicant: Microsoft Technology Licensing, LLC, Redmond, WA (US)

(72) Inventor: Jeffrey William Pasternack, Belmont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 217 days.

(21) Appl. No.: 16/177,035

(22) Filed: Oct. 31, 2018

(65) Prior Publication Data
US 2020/0134013 A1    Apr. 30, 2020

(51) Int. Cl.
*G06F 40/263*    (2020.01)
*G06N 5/04*    (2006.01)
*G06F 16/335*    (2019.01)
*G06F 16/33*    (2019.01)

(52) U.S. Cl.
CPC .......... *G06F 40/263* (2020.01); *G06F 16/337* (2019.01); *G06F 16/3346* (2019.01); *G06N 5/04* (2013.01)

(58) Field of Classification Search
CPC ....... G10L 15/22; G10L 15/26; G10L 15/005; G06F 40/58; G06F 40/263; G06N 20/00
See application file for complete search history.

(56) References Cited

U.S. PATENT DOCUMENTS

| | | | |
|---|---|---|---|
| 2013/0339456 A1* | 12/2013 | Nikolayev | H04L 51/12 709/206 |
| 2014/0337425 A1* | 11/2014 | Buryak | G06Q 50/01 709/204 |
| 2015/0161114 A1* | 6/2015 | Buryak | G06F 40/58 704/8 |
| 2015/0161227 A1* | 6/2015 | Buryak | G06F 9/454 707/738 |
| 2017/0024372 A1* | 1/2017 | Bojja | G06F 40/263 |
| 2017/0221471 A1* | 8/2017 | Sharifi | G06F 40/253 |
| 2017/0337263 A1* | 11/2017 | Muralidharan | G06F 16/9535 |
| 2019/0065458 A1* | 2/2019 | Brunet | G06Q 50/01 |
| 2019/0294685 A1* | 9/2019 | Sanjekar | G06F 16/9535 |
| 2019/0318735 A1* | 10/2019 | Chao | G10L 15/005 |

* cited by examiner

*Primary Examiner* — Mark Villena
(74) *Attorney, Agent, or Firm* — Schwegman Lundberg & Woessner, P.A.

(57) ABSTRACT

Disclosed are systems, methods, and non-transitory computer-readable media for a language proficiency inference system used to determine a user's proficiency in one or more languages. The language proficiency inference system determines both text-based probability scores and profile-based probability scores indicating a probability that a user speaks a language or set of languages. The text-based probability score is based on text associated with the first user, whereas the profile-based probability score is based profile data of the user. The language proficiency inference system determines aggregated probability scores based on the corresponding text-based and profile-based probability scores. For example, the aggregated probability score is the sum of the text and profile-based probability scores. The language proficiency inference system uses the aggregated scores to determine the languages in which the user is proficient.

17 Claims, 7 Drawing Sheets

LANGUAGE PROFICIENCY INFERENCE SYSTEM

TECHNICAL FIELD

An embodiment of the present subject matter relates generally to data inference and, more specifically, to language proficiency inference.

BACKGROUND

Many online services support multiple languages. For example, a content provider may maintain a copy of the same content in English and Spanish and present the appropriate version of the content to a user based on the user's native language. As another example, a recommendation system may generate recommended responses for a user in the user's native language. Determining the user's language proficiency is therefore vital to the functionality of these systems, however is not always an easy task. The data available for a user may be limited, and therefore inadequate to properly determine the user's language proficiency. For example, many users have incomplete profile data that describes the user. Further, user behavior is often noisy and unreliable to properly determine a user's language proficiency. For example, a user may click an article in a foreign language simply to view the images, rather than read the text. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
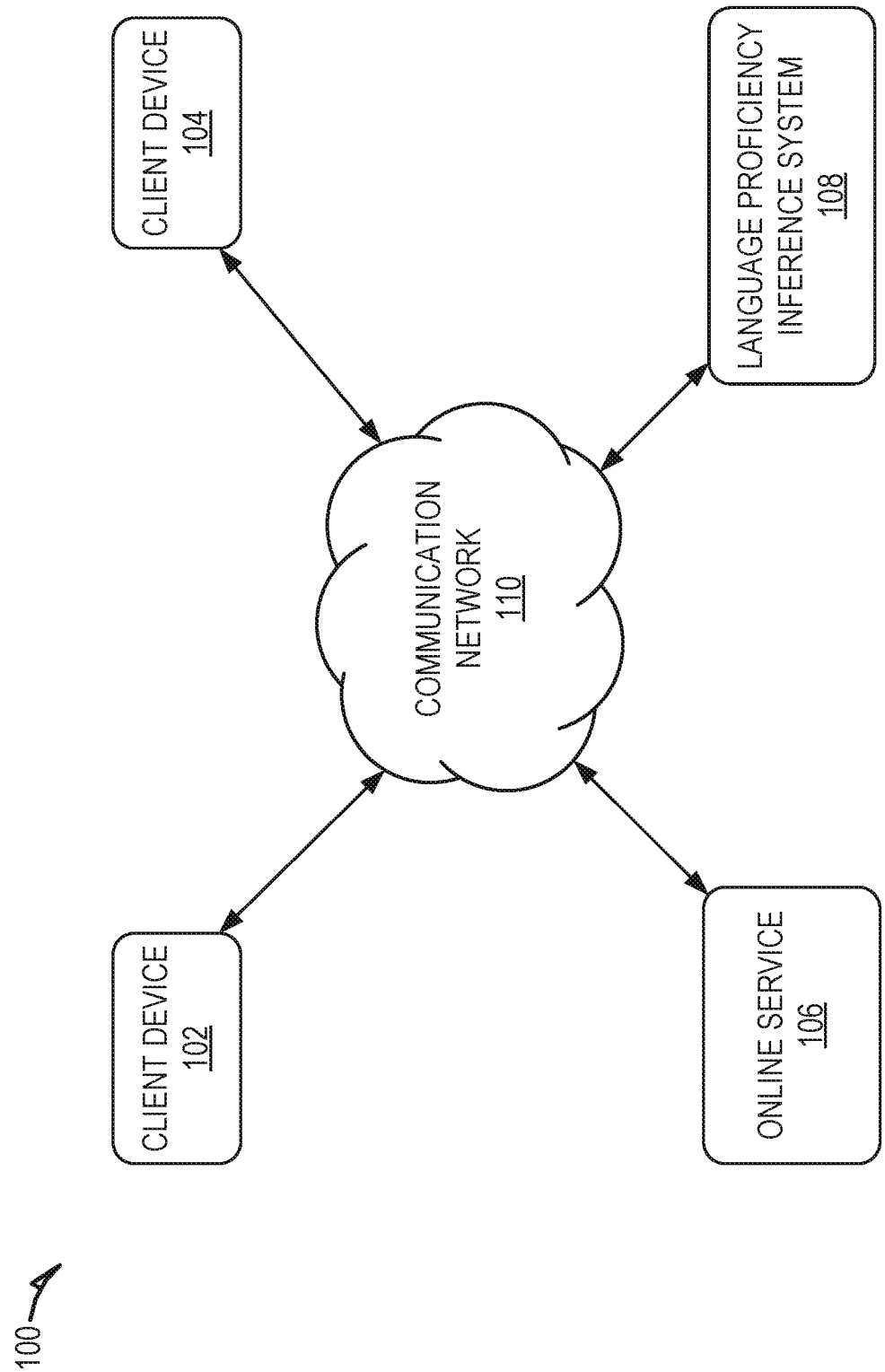
FIG. 1 shows an example system configuration, wherein electronic devices communicate via a network for purposes of exchanging content and other data.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for a language proficiency inference system used to determine a user's proficiency in one or more languages. The user's proficiency in a language indicates how well the user speaks and/or understands the language. The language proficiency inference system uses both a user's profile data, as well as text associated with the user, to determine the user's proficiency in a language. The user's profile data includes data describing the user, such as the user's address, nationality, employer, education history, etc. The text associated with the user includes text that was authored and/or viewed by the user.

Previous approaches for determining a user's language proficiency depend on counters. Specifically, previous approaches count the number of times a user engages with text in a particular language as determined by a language classifier. The user's proficiency in a language is then determined based on the determined count for the particular language. While simple, this approach fails if the language classifier is sufficiently noisy. Further, this approach is only suitable for finding either a single spoken language or a distribution over languages, although the results in this regard are questionable in quality. The previous approach is not, however, suitable for determining a set of languages spoken by a user.

The language proficiency inference system alleviates these prior shortcomings. Rather than relying simply on a counter, the language proficiency inference system determines both a text-based probability score that a user speaks a given language or given set of languages and a profile-based probability score that the user speaks the given language or the given set of languages. The text-based probability score is determined based on the text associated with the user, while the profile-based probability score is based on the user's profile data. The language proficiency inference system determines an aggregated probability score that a user speaks a given language or set of given languages based on the text-based probability score and the profile-based probability scores. The language proficiency inference system uses the aggregated probability scores to infer the user's proficiency in each language. For example, the language proficiency inference system infers that the language or set of languages for which the user has the highest aggregated probability score is the user's primary language (s). By utilizing multiple data signals and determining probability scores for sets of languages, the language proficiency inference system more accurately gauges the number of languages a user is likely to speak, as well as the user's proficiency in those specific languages.

The user's inferred language proficiency may be used for several purposes. For example, the user's inferred language proficiency may be used to select content to present to the user. That is, the content selected for the user may be in the user's inferred primary language. As another example, the user's inferred language proficiency may be use when generating recommended messages for the user. A messaging system may provide users with recommended responses that the user may use to respond to a received message. The messaging system may use the user's inferred language proficiency to determine the language in which to generate the recommended responses.

FIG. 1 shows an example system 100, wherein electronic devices communicate via a network for purposes of exchanging content and other data. As shown, multiple devices (i.e., client device 102, client device 104, online service 106, and language proficiency inference system 108) are connected to a communication network 110 and configured to communicate with each other through use of the communication network 110. The communication network 110 is any type of network, including a local area network (LAN), such as an intranet, a wide area network (WAN), such as the interne, or any combination thereof. Further, the communication network 110 may be a public network, a private network, or a combination thereof. The communication network 110 is implemented using any number of communications links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 700 shown in FIG. 7.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the online service 106 to utilize the services provided by the online service 106. The online service 106 may provide any type of service, such as a social networking service, online retail service, messaging service, etc. For example, the online service 16 may provide messaging functionality that enables users to establish and participate in communication sessions with each other. Users may the client devices 102 and 104 that are connected to the communication network 110 by direct and/or indirect communication to communicate with and utilize the functionality of the online service 106.

Although the shown system 100 includes only two client devices 102, 104, this is only for ease of explanation and is not meant to be limiting. One skilled in the art would appreciate that the system 100 can include any number of client devices 102, 104. Further, the online service 106 may concurrently accept connections from and interact with any number of client devices 102, 104. The online service 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the online service 106 via a client-side application installed on the client devices 102 and 104. In some embodiments, the client-side application includes a component specific to the online service 106. For example, the component may be a stand-alone application, one or more application plug-ins, and/or a browser extension. However, the users may also interact with the online service 106 via a third-party application, such as a web browser, that resides on the client devices 102 and 104 and is configured to communicate with the online service 106. In either case, the client-side application presents a user interface (UI) for the user to interact with the online service 106. For example, the user interacts with the online service 106 via a client-side application integrated with the file system or via a webpage displayed using a web browser application.

The online service 106 is one or more computing devices configured to provide one or more services. For example, the online service 106 may be a messaging service that facilitates and manages communication sessions between various client devices 102, 104. As another example, the online service 106 may be a social networking service that allows users to share content with other members of the social networking service as well as view content posted by other members of the social networking service.

As part of its provided service, the online service 106 may select or generate content for a user and present the content to the user. For example, a social networking service may select content to be presented to a user in the user's feed on the social networking service. As another example, a messaging service may generate recommended response messages for a user that the user may use to respond to another user during a communication session (e.g., email communication session, instant messaging session, etc.).

To provide a user with relevant content, the online service 106 may select and/or generate content for a user based on the user's inferred proficiency in one or more languages. A user's inferred proficiency in a language indicates an estimated level at which the user can understand and/or use the given language. The online service 106 uses the user's inferred proficiency in one or more languages to select and/or generate content for a user in a language in which the user has sufficient proficiency. For example, the online service 106 may have access to multiple versions of an article that are each in a different language. The online service 106 may select a version of the content item to present to the user based on the user's proficiency in each available language of the article, such that the user is presented with the article in the language in which the user is most proficient.

The language proficiency inference system 108 determines a user's language proficiency in a given language or a set of languages. The language proficiency inference system 108 is shown as being separate from the online service 106, however this is just one example and is not meant to be limiting. The language proficiency inference system 108 may also be incorporated as part of the online service 106 or as part of another online service (not shown)

The language proficiency inference system 108 determines the language proficiency of a user in a given language or set of languages based on both a user's profile data and as text associated with the user. The user's profile data includes data describing the user, such as the user's address, nationality, employer, education history, etc. The text associated with the user includes text that the user has engaged with. For example, the text associated with the user included text that was authored, viewed, liked, commented on, etc., by the user. The online service 106 may maintain a user profile for users of the online service 106, which includes both the user profile data as well as user interaction data that indicates content that a user has engaged with (e.g., read, authored, etc.) while using the online service 106.

The language proficiency inference system 108 determines both a text-based probability score that a user speaks a given language or set of languages and a profile-based probability score that the user speaks the given language or set of languages. The text-based probability score is determined based on the text associated with the user, while the profile-based probability score is based on the user's profile data. The language proficiency inference system 108 determines an aggregated probability score that a user speaks a given language or set of languages based on the text-based probability score and the profile-based probability score.

The probability scores, either the text-based, profile-based, or aggregated probability scores, may be a numeric value indicating a probability, or alternatively, another type of value that is based on the determined probability. For instance, a probability score may be a score indicating the relative probability, however not itself representing the actual probability value. As another example, the probability score may represent a ranking relative to the other scores. Accordingly, the highest probability score would be represented as 1, rather than the percentage of probability.

The language proficiency inference system 108 uses the aggregated probability scores to infer the user's proficiency in each language and set of languages. For example, the language proficiency inference system 108 infers that the language for which the user has the highest aggregated probability score is the user's primary language. Likewise, the language proficiency inference system 108 may determine that a user is not proficient in a given language if the user's aggregated probability score for the given language is below a predetermined threshold.

Figure 2:
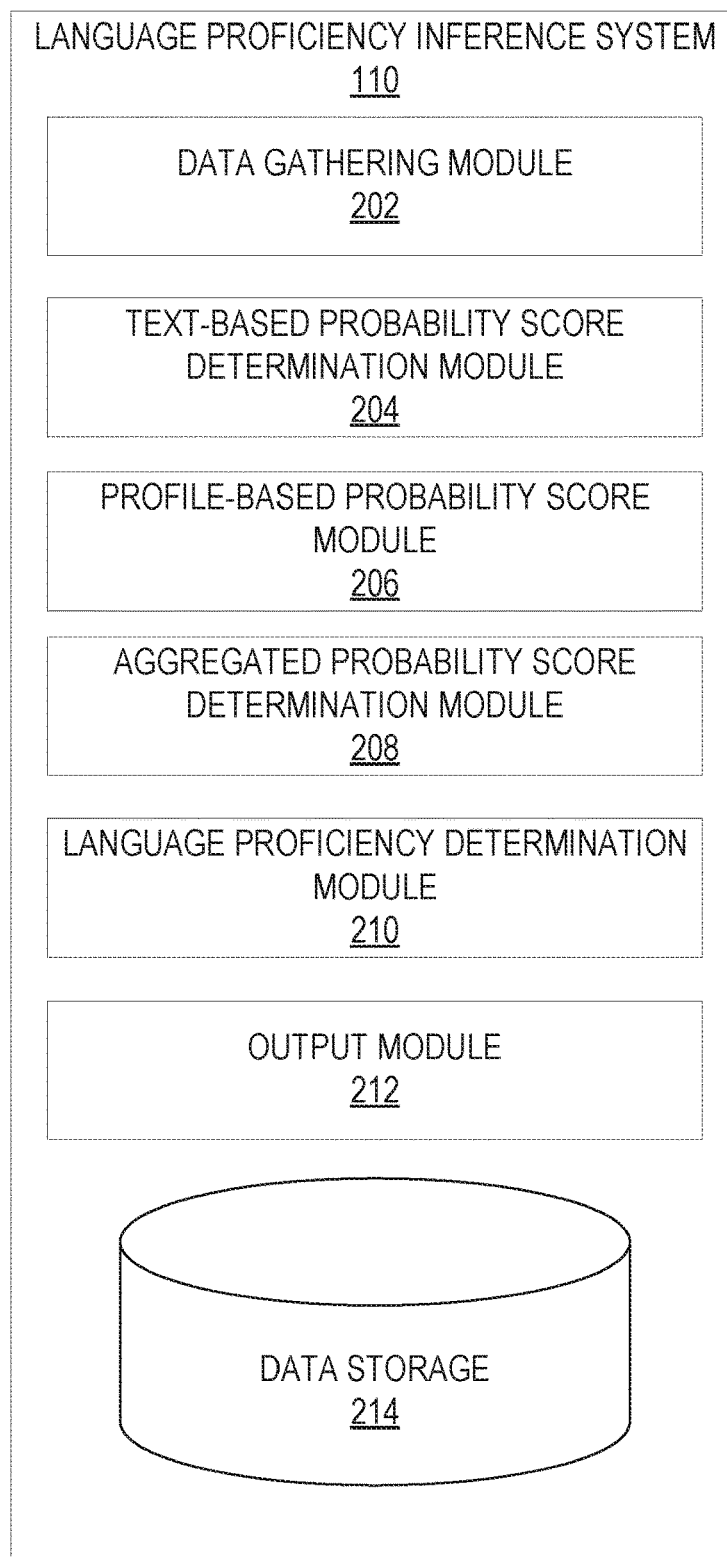
FIG. 2 is a block diagram of the language proficiency inference system, according to some example embodiments.

FIG. 2 is a block diagram of the language proficiency inference system 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the language proficiency inference system 108 to facilitate additional functionality that is not specifically described herein. Furthermore, the various functional modules depicted in FIG. 2 may reside on a single computing device or may be distributed across several computing devices in various arrangements such as those used in cloud-based architectures. For example, the various functional modules and components may be distributed amongst computing devices that facilitate both the language proficiency inference system 108 and the online service 106.

As shown, the language proficiency inference system 108 includes a data gathering module 202, a text-based probability score determination module 204, a profile-based probability score determination module 206, an aggregated probability score determination module 208, a language proficiency determination module 210, an output module 212, and a data storage 214.

The data gathering module 202 gathers data used by the language proficiency inference system 110 to determine a user's proficiency in one or more languages. Specifically, the data gathering module 202 gathers data from the data storage 214. The data storage 214 maintains user profile data for users of the online service 106. Although the data storage 214 is shown as being a part of the language proficiency inference system 110, it may alternatively be a part of the online service 106. In this type of embodiments, the data gathering module 202 communicates with the online service 106 to access the data storage 214.

The user profile data stored in the data storage 214 includes profile data describing a user, such as the user's address, nationality, employer, education history, etc., as well as interaction data describing text associated with the user. That is, the interaction data indicates text that the user has engaged with by, for example, authoring the text, reading the text, liking the text, providing feedback to the text, clicking on the text, etc.

The profile data stored in the data storage 214 is associated with a unique user identifier assigned to the corresponding user. The data gathering module 202 uses the unique user identifier for a user to identify the corresponding user profile data in the data storage 214. Once the data gathering module 202 has identified the user profile associated with the unique identifier, the data gathering module 202 gathers the user profile data, including the data describing the user and the user's interaction data.

The text-based probability score determination module 204 determines text-based probability scores that a user speaks a given language or a set of given languages. The text-based probability score determination module 204 determines the text-based probability scores based on text associated with the user, such as text that the user has authored, read, clicked, liked, etc. For example, determined incidences of the user engaging with a given language increases the probability that the user speaks the language. The text-based probability score determination module 204 can use any type of suitable model or algorithm to determine the text-based probability scores that a user speaks a given language or set of languages. In some embodiments, the text-based probability score determination module 204 applies different weights to text that user has engaged with based on the type of engagement and/or text. For example, the text-based probability score determination module 204 may add additional weight to texts written by the user, and less weight to texts that were read by the user. In some embodiments, the text-based probability score determination module 204 may apply additional weights to text-based on the length of the engagement. For example, the text-based probability score determination module 204 may give more weight to text that the user spent a longer time reading or otherwise engaging with, and less weight to text that the user read or engaged with for just a short period of time.

The text-based probability score determination module 204 may determine scores for individual pieces of text and use these individual scores to calculate the final text-based probability scores. As explained previously, the text-based probability score determination module 204 may apply varying weights to the individual scores based on the type of text and/or the type or duration of the engagement. The text-based probability score determination module 204 may utilize a minimum score for a text-based probability score, such that a text-based probability score is not a zero.

In some embodiments, the text-based probability score determination module 204 determines a text-based probability score for each of a set of languages, as well as all possible combination of the set of languages. For example, assuming the set of languages includes English and French, the text-based probability score determination module 204 determines a text-probability scores that the user speaks English, a text-probability scores that the user speaks French, and a text-probability scores that the user speaks both English and French. Likewise, if the set of languages includes English, French and Spanish, the text-based probability score determination module 204 determines a text-probability scores that the user speaks English, a text-probability scores that the user speaks French, a text-probability scores that the user that the user speaks Spanish, a text-probability scores that the user speaks English and French, a text-probability scores that the user speaks English and Spanish, a text-probability scores that the user speaks French and Spanish, and a text-probability scores that the user speaks English, French and Spanish.

The profile-based probability score determination module 206 determines profile-based probability scores that a user speaks a given language or a set of given languages. In contrast to a text-based probability score, the profile-based probability score determination module 206 determines the profile-based probability scores based on user profile data of the user, such as the user's address, nationality, employment history, etc. The profile-based probability score determination module 206 may determine the profile-based probability score in a two-part process. First, the profile-based probability score determination module 206 may use the profile data to determine probability scores indicating the number of languages the user speaks. For example, many Europeans speak three or more languages, whereas Americans often speak only one or two languages. Additionally, the profile-based probability score determination module 206 may use profile data to determine probability scores that the user speaks a given language or set of languages. For example, the profile-based probability score determination module 206 may use the user's nationality and residence to infer the languages that user is proficient in. The profile-based probability score determination module 206 combines these values to determine that profile-based probability scores that the user speaks a given language or set of languages. That is the profile-based probability score determination module 206 uses the probability scores indicating the number of languages the user speaks and the probability scores that the user speaks a given language or set of languages to determine the final profile-based probability scores. The profile-based probability score determination module 206 can use any type of suitable model or algorithm to determine the profile-based probability scores that a user speaks a given language or set of languages.

The profile-based probability score determination module 206 determines profile-based probability scores for the same set of languages and/or combination of languages for which the text-based probability score determination module 204 determined text-based probability scores. As a result, a text-based probability score and profile-based probability score is determined for each individual language and/or set of languages.

The aggregated probability score determination module 208 determines aggregated probability scores that a user a speaks a given language or a set of given languages. The aggregated probability score determination module 208 determines the aggregated probability scores that a user a speaks a given language or a set of given languages based on the text-based probability score and the profile-based probability scores that the user speaks the given language or set of given language. For example, the aggregated probability score determination module 208 determines the aggregated probability score that a user speaks Spanish based on the text-based probability score that the user speaks Spanish and the profile-based probability score that the user speaks Spanish. As another example, the aggregated probability score determination module 208 determines that aggregated probability score that a user speaks Spanish and English based on the text-based probability score that the user speaks Spanish and English, and the profile-based probability score that the user speaks Spanish and English.

The aggregated probability score determination module 208 can determine the aggregated probability score in any number of ways. For example, in some embodiments, the aggregated probability score determination module 208 determines an aggregated probability score by summing or multiplying the corresponding text-based probability score and profile-based probability score. For example, the aggregated probability score determination module 208 determines the aggregated probability score that a user speaks Spanish by summing the text-based probability score that the user speaks Spanish with the profile-based probability score that the user speaks Spanish. This is just one example, however, and is not meant to be limiting. The aggregated probability score determination module 208 may use any suitable formula to determine the aggregated probability score based on the corresponding text-based probability score and profile-based probability score. For example, in some embodiments, the aggregated probability score determination module 208 maximizes the text-based probability score and the profile-based probability score using an algorithm such as the following:

$$\sum_{t \in T} \max_{l \in L} \text{weight}(t) * \ln(\max(K, P_{classifier}(l \mid t)))$$

The language proficiency determination module 210 determines a user's proficiency in a language or set of languages based on the aggregated probability score that the user speaks the language or set of languages. For example, the language proficiency determination module 210 compares the aggregated probability scores to each other the determine the highest aggregated probability score. The language proficiency determination module 210 then determines that the user is proficient in the language or set of languages associated with the highest aggregated probability score. For example, the language proficiency determination module 210 may compare the aggregated probability score that the user speaks either Spanish, English, or the set of Spanish and English, and determines that the user is proficient in the language or set of languages that has the highest aggregated probability score. That is, the language proficiency determination module 210 determines that the user is only proficient in Spanish if the aggregated probability score for Spanish is the highest, the user is only proficient in English if the aggregated probability score for English is the highest, or the user is proficient in both Spanish and English if the aggregated probability score for the set of Spanish and English is the highest.

In the event that the language proficiency determination module 210 determines that a user is proficient in a set of 2 or more languages, the language proficiency determination module 210 may determine an order of proficiency of the user in the languages. That is, the language proficiency determination module 210 may determine the language that is the user's primary language, secondary language, tertiary language, etc. The language proficiency determination module 210 may determine the order of proficiency in a number of ways. For example, the language proficiency determination module 210 may use the aggregated probability scores for each language in the set to determine the order of proficiency. That is, if the language proficiency determination module 210 determines that the user is proficient in both Spanish and English, the language proficiency determination module 210 uses the aggregated probability score that the user speaks Spanish only and the aggregated probability score that the user speaks English only to determine which language is the user's primary language and which language is the user's secondary language. The language proficiency determination module 210 determines that the language that has the higher aggregated probability score is the user's primary language.

As another example, the language proficiency determination module 210 may use the user's region to determine the user's primary language. For example, the language proficiency determination module 210 may determine that the language commonly spoken in the geographic area that the user currently lives in, lived in the longest, or grew up in is the user's primary language.

In some embodiments, the language proficiency determination module 210 may use a known common order in which languages are learned to deter mine the proficiency order of the languages. For example, it may be common for a user to initially learn English, followed by Spanish and then French. Accordingly, the language proficiency determination module 210 may determine the user's proficiency order based on this known order in which languages are commonly learned.

The output module 212 updates the user's profile in the data storage 214 to reflect the user's determined language proficiency. This may include updating the user's profile to indicate the languages that the user is proficient in, as well as the proficiency order of the languages. For example, the output module 212 may update the user's profile to indicate the user's primary language, secondary language, tertiary language, etc. In sonic embodiments, the output module 212 may also update the user's profile to reflect the languages in which the user is not proficient. For example, the output module 212 may update the user's profile to indicate that the user is not proficient in languages for which the corresponding aggregated probability score is below a threshold score.

The online service 106 may use the user's language proficiency for a variety of uses, such as when generating and or selecting content for the user. For example, the online service 106 may utilize the user's determined language proficiency in determining a version of a content item to present to the user. The online service 106 may maintain multiple versions of a content item that are in different languages. When selecting which version of the content item to present to a user, the online service 106 may determine from the user's profile in the data storage 214 the languages in which the user is proficient and select a content item accordingly. As another example, the online service 106 may use the user's language proficiency to select a language in which to generate a recommended message response for the user. These are only a couple of examples of how the online service 106 may use a user's language proficiency, and are not meant to be limiting.

Figure 3:
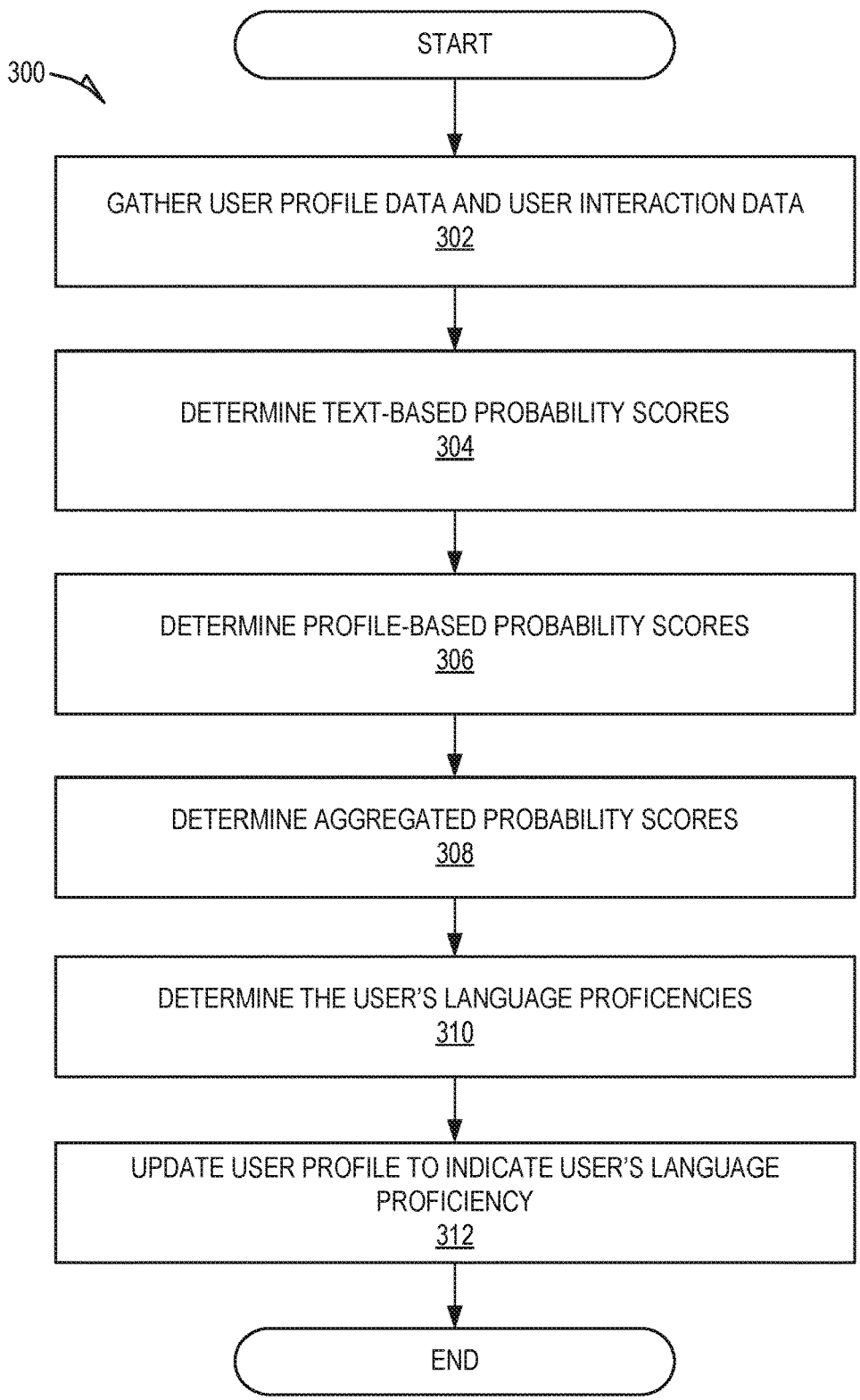
FIG. 3 is a flowchart showing an example method of determining a user's proficiency in one or more languages, according to certain example embodiments

FIG. 3 is a flowchart showing an example method 300 of determining a user's proficiency in one or more languages, according to certain example embodiments. The method 300 may be embodied in computer readable instructions for execution by one or more processors such that the operations of the method 300 may be performed in part or in whole by the language proficiency inference system 110; accordingly, the method 300 is described below by way of example with reference thereto. However, it shall be appreciated that at least some of the operations of the method 300 may be deployed on various other hardware configurations and the method 300 is not intended to be limited to the language proficiency inference system 110.

At operation 302, the data gathering module 202 gathers user profile data and user interaction data. The data gathering module 202 gathers data used by the language proficiency inference system 110 to determine a user's proficiency in one or more languages. Specifically, the data gathering module 202 gathers data from the data storage 214. The data storage 214 maintains user profile data for users of the online service 106. Although the data storage 214 is shown as being a part of the language proficiency inference system 110, it may alternatively be a part of the online service 106. In this type of embodiments, the data gathering module 202 communicates with the online service 106 to access the data storage 214.

The user profile data stored in the data storage 214 includes profile data describing a user, such as the user's address, nationality, employer, education history, etc., as well as interaction data describing text associated with the user. That is, the interaction data indicates text that the user has engaged with by, for example, authoring the text, reading the text, liking the text, providing feedback to the text, clicking on the text, etc.

The profile data stored in the data storage 214 is associated with a unique user identifier assigned to the corresponding user. The data gathering module 202 uses the unique user identifier for a user to identify the corresponding user profile data in the data storage 214. Once the data gathering module 202 has identified the user profile associated with the unique identifier, the data gathering module 202 gathers the user profile data, including the data describing the user and the user's interaction data.

At operation 304, the text-based probability determination module 204 determines text-based probability scores. The text-based probability scores indicate a probability that a user speaks a given language or a set of given languages. The text-based probability score determination module 204 determines the text-based probability scores based on text associated with the user, such as text that the user has authored, read, clicked, liked, etc. For example, determined incidences of the user engaging with a given language increases the probability that the user speaks the language. The text-based probability score determination module 204 can use any type of suitable model or algorithm to determine the text-based probability scores that a user speaks a given language or set of languages. In some embodiments, the text-based probability score determination module 204 applies different weights to text that user has engaged with based on the type of engagement and/or text. For example, the text-based probability score determination module 204 may add additional weight to texts written by the user, and less weight to texts that were read by the user. In some embodiments, the text-based probability score determination module 204 may apply additional weights to text-based on the length of the engagement. For example, the text-based probability score determination module 204 may give more weight to text that the user spent a longer time reading or otherwise engaging with, and less weight to text that the user read or engaged with for just a short period of time.

The text-based probability score determination module 204 may determined scores for individual pieces of text and use these individual scores to calculate the final text-based probability scores. As explained previously, the text-based probability score determination module 204 may apply varying weights to the individual scores based on the type of text and/or the type or duration of the engagement. The text-based probability score determination module 204 may utilize a minimum score for a text-based probability score, such that a text-based probability score is not a 0.

In some embodiments, the text-based probability score determination module 204 determines a text-based probability score for each of a set of languages, as well as all possible combination of the set of languages. For example, assuming the set of languages includes English and French, the text-based probability score determination module 204 determines a text-probability scores that the user speaks English, a text-probability scores that the user speaks French, and a text-probability scores that the user speaks both English and French. Likewise, if the set of languages includes English, French and Spanish, the text-based probability score determination module 204 determines a text-probability scores that the user speaks English, a text-probability scores that the user speaks French, a text-probability scores that the user that the user speaks Spanish, a text-probability scores that the user speaks English and French, a text-probability scores that the user speaks English and Spanish, a text-probability scores that the user speaks French and Spanish, and a text-probability scores that the user speaks English, French and Spanish.

At operation 306, the profile-based probability score determination module 206 determines profile-based probability scores. The profile-based probability scores indicate a probability that a user speaks a given language or a set of given languages. In contrast to a text-based probability score, the profile-based probability score determination module 206 determines the profile-based probability scores based on user profile data of the user, such as the user's address, nationality, employment history, etc. The profile-based probability score determination module 206 may determine the profile-based probability score in a two-part process. First, the profile-based probability score determination module 206 may use the profile data to determine probability scores indicating the number of languages the user speaks. For example, many Europeans speak 3 or more languages, whereas Americans often speak only 1 to 2 language. Additionally, the profile-based probability score determination module 206 may use profile data to determine probability scores that the user speaks a given language or set of languages. For example, the profile-based probability score determination module 206 may use the user's nationality and residence to infer the languages that user is proficient in. The profile-based probability score determination module 206 combines these values to determine that profile-based probability scores that the user speaks a given language or set of languages. That is the profile-based probability score determination module 206 uses the probability scores indicating the number of languages the user speaks and the probability scores that the user speaks a given language or set of languages to determine the final profile-based probability scores. The profile-based probability score determination module 206 can use any type of suitable model or algorithm to determine the profile-based probability scores that a user speaks a given language or set of languages.

The profile-based probability score determination module 206 determines profile-based probability scores for the same set of languages and/or combination of languages for which the text-based probability score determination module 204 determined text-based probability scores. As a result, a text-based probability score and profile-based probability score is determined for each individual language and/or set of languages.

At operation 308, the aggregated probability score determination module 208 determines aggregated probability scores. The aggregated probability score determination module 208 determines the aggregated probability scores that a user a speaks a given language or a set of given languages based on the text-based probability score and the profile-based probability scores that the user speaks the given language or set of given language. For example, the aggregated probability score determination module 208 determines the aggregated probability score that a user speaks Spanish based on the text-based probability score that the user speaks Spanish and the profile-based probability score that the user speaks Spanish. As another example, the aggregated probability score determination module 208 determines that aggregated probability score that a user speaks Spanish and English based on the text-based probability score that the user speaks Spanish and English, and the profile-based probability score that the user speaks Spanish and English.

The aggregated probability score determination module 208 can determine the aggregated probability score in any number of ways. For example, in some embodiments, the aggregated probability score determination module 208 determines an aggregated probability score by summing the corresponding text-based probability score and profile-based probability score. For example, the aggregated probability score determination module 208 determines the aggregated probability score that a user speaks Spanish by summing the text-based probability score that the user speaks Spanish with the profile-based probability score that the user speaks Spanish. This is just one example, however, and is not meant to be limiting. The aggregated probability score determination module 208 may use any suitable formula to determine the aggregated probability score based on the corresponding text-based probability score and profile-based probability score.

At operation 310, the language proficiency determination module 210 determines a user's proficiency in a language or set of languages based on the aggregated probability score that the user speaks the language or set of languages. For example, the language proficiency determination module 210 compares the aggregated probability scores to each other the determine the highest aggregated probability score. The language proficiency determination module 210 then determines that the user is proficient in the language or set of languages associated with the highest aggregated probability score. For example, the language proficiency determination module 210 may compare the aggregated probability score that the user speaks either Spanish, English, or the set of Spanish and English, and determines that the user is proficient in the language or set of languages that has the highest aggregated probability score. That is, the language proficiency determination module 210 determines that the user is only proficient in Spanish if the aggregated probability score for Spanish is the highest, the user is only proficient in English if the aggregated probability score for English is the highest, or the user is proficient in both Spanish and English if the aggregated probability score for the set of Spanish and English is the highest.

In the event that the language proficiency determination module 210 determines that a user is proficient in a set of 2 or more languages, the language proficiency determination module 210 may determine an order of proficiency of the user in the languages. That is, the language proficiency determination module 210 may determine the language that is the user's primary language, secondary language, tertiary language, etc. The language proficiency determination module 210 may determine the order of proficiency in a number of ways. For example, the language proficiency determination module 210 may use the aggregated probability scores for each language in the set to determine the order of proficiency. That is, if the language proficiency determination module 210 determines that the user is proficient in both Spanish and English, the language proficiency determination module 210 uses the aggregated probability score that the user speaks Spanish only and the aggregated probability score that the user speaks English only to determine which language is the user's primary language and which language is the user's secondary language. The language proficiency determination module 210 determines that the language that has the higher aggregated probability score is the user's primary language.

As another example, the language proficiency determination module 210 may use the user's region to determine the user's primary language. For example, the language proficiency determination module 210 may determine that the language commonly spoken in the geographic area that the user currently lives in, lived in the longest, or grew up in is the user's primary language.

In some embodiments, the language proficiency determination module 210 may use a known common order in which languages are learned to determine the proficiency order of the languages. For example, it may be common for a user to initially learn English, followed by Spanish and then French. Accordingly, the language proficiency determination module 210 may determine the user's proficiency order based on this known order in which languages are commonly learned.

At operation 312, the output module 212 updates the user's profile in the data storage 214 to reflect the user's determined language proficiency. This may include updating the user's profile to indicate the languages that the user is proficient in, as well as the proficiency order of the languages. For example, the output module 212 may update the user's profile to indicate the user's primary language, secondary language, tertiary language, etc. In some embodiments, the output module 212 may also update the user's profile to reflect the languages in which the user is not proficient. For example, the output module 212 may update the user's profile to indicate that the user is not proficient in languages for which the corresponding aggregated probability score is below a threshold score.

The online service 106 may use the user's language proficiency for a variety of uses, such as when generating and or selecting content for the user. For example, the online service 106 may utilize the user's determined language proficiency in determining a version of a content item to present to the user. The online service 106 may maintain multiple versions of a content item that are in different languages. When selecting which version of the content item to present to a user, the online service 106 may determine from the user's profile in the data storage 214 the languages in which the user is proficient and select a content item accordingly. As another example, the online service 106 may use the user's language proficiency to select a language in which to generate a recommended message response for the user. These are only a couple of examples of how the online service 106 may use a user's language proficiency, and are not meant to be limiting.

Figure 4:
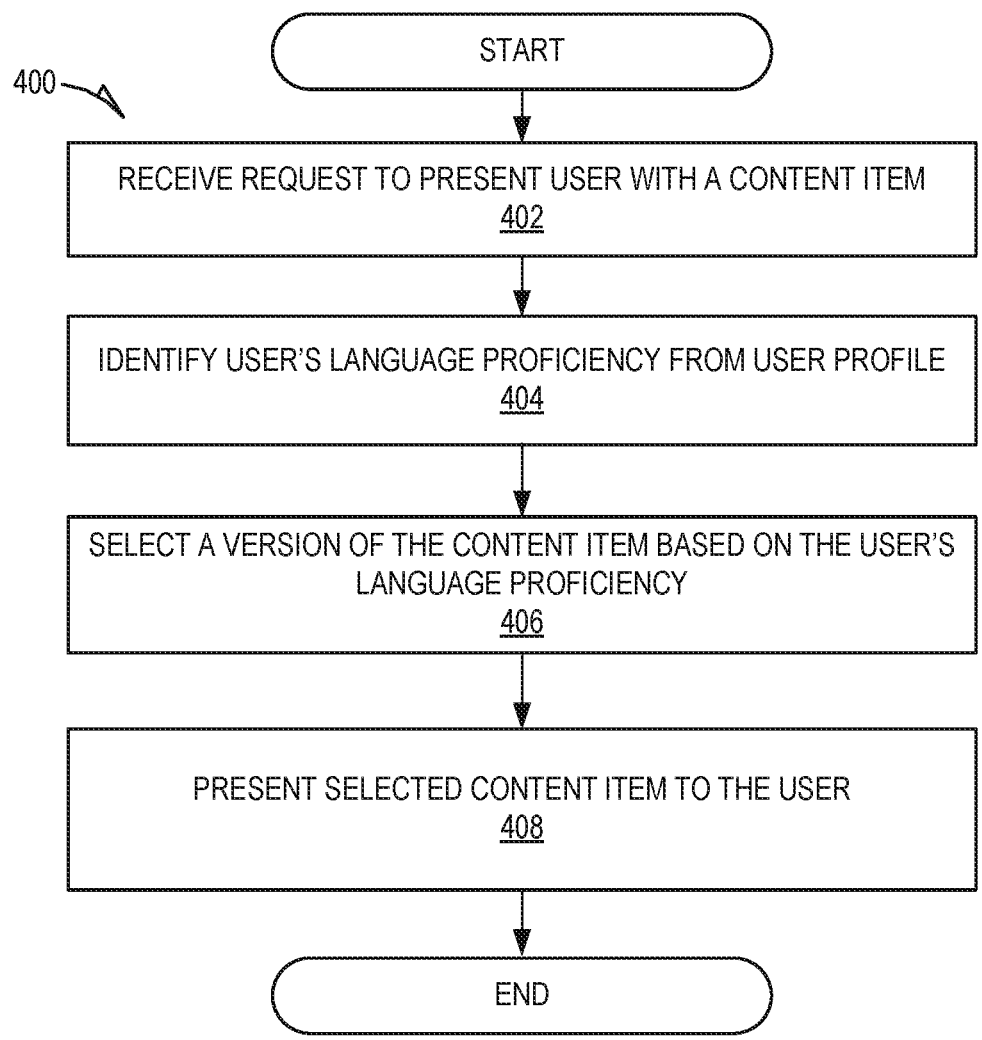
FIG. 4 is a flowchart showing an example method of selecting content based on a user's language proficiency, according to certain example embodiments.

FIG. 4 is a flowchart showing an example method 400 of selecting content based on a user's language proficiency, according to certain example embodiments. The method 400 may be embodied in computer readable instructions for execution by one or more processors such that the operations of the method 400 may be performed in part or in whole by the online service 106; accordingly, the method 400 is described below by way of example with reference thereto. However, it shall be appreciated that at least some of the operations of the method 400 may be deployed on various other hardware configurations and the method 400 is not intended to be limited to the online service 106.

At operation 402, the online service 106 receives a request to present a user with a content item. For example, the online service 106 may be a social networking service and the request may be transmitted as a result of the user logging into their account. As another example, the online service 106 may be a news site and the request may be transmitted as a result of a user selecting to view an article.

At operation 404, the online service 106 identifies the user language proficiency from the user's profile. For example, the online service 106 accesses the user's profile in the data storage 214 and gathers the users stored language proficiency. The user's language proficiency may have been determined and updated by the language proficiency inference system 110.

At operation 406, the online service 106 selects a version of the content item based on the user's language proficiency. For example, the online service 106 selects a version of the content item that is written in the users primary or secondary language.

At operation 408, the online service 106 presents the selected content item to the user. For example, the online service 106 transmits the content item to a client device 102 of the user, where the content item is then presented to the user by the client device 102.

Figure 5:
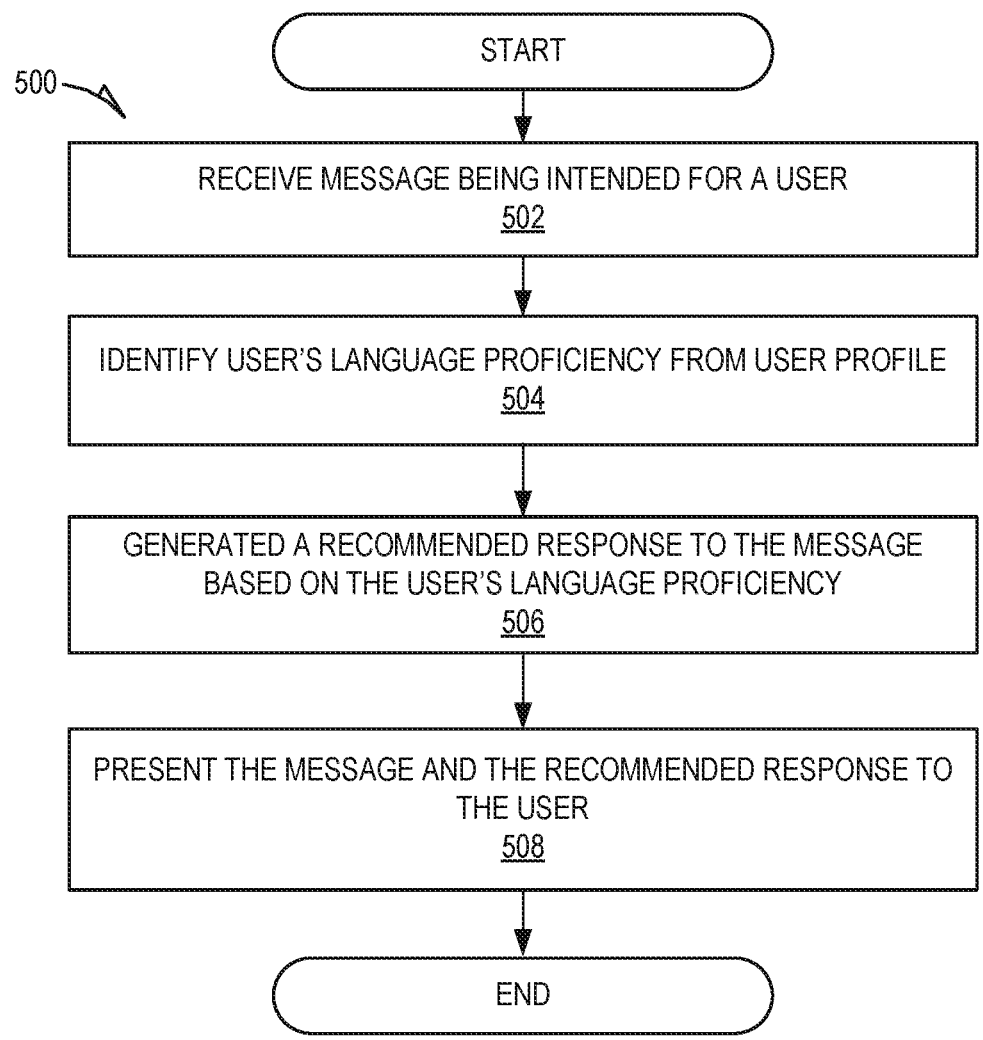
FIG. 5 is a flowchart showing an example method of generating recommended response messages based on a user's language proficiency, according to certain example embodiments.

FIG. 5 is a flowchart showing an example method 500 of generating recommended response messages based on a user's language proficiency, according to certain example embodiments. The method 500 may be embodied in computer readable instructions for execution by one or more processors such that the operations of the method 500 may be performed in part or in whole by the online service 106; accordingly, the method 500 is described below by way of example with reference thereto. However, it shall be appreciated that at least some of the operations of the method 500 may be deployed on various other hardware configurations and the method 500 is not intended to be limited to the online service 106.

At operation 502, the online service 106 receives a message intended for a recipient user. For example, the online service 106 may be me a messaging service that facilitates communication sessions between multiple user client devices 102, 104. A communication allows users to transmit messages back and forth via the online service 106. For example, messages transmitted from a first client device 102 to a second client device 104 are initially routed to the online service 106. The online service 106 then forwards the message to its intended recipient client device 104.

At operation 504, the online service 106 identifies the user language proficiency from the user's profile. For example, the online service 106 accesses the user's profile in the data storage 214 and gathers the users stored language proficiency. The user's language proficiency may have been determined and updated by the language proficiency inference system 110.

At operation 506, the online service 106 generates a recommended response to the received message based on the user's language proficiency. For example, the online service 106 generates the recommended response in the users primary or secondary language.

At operation 508, the online service 106 transmits the message and the recommended response to the recipient user's client device 104. The client device 104 presents the message and the recommended response to the recipient user. The user may select the recommended response to quickly reply to the received message.

Software Architecture

Figure 6:
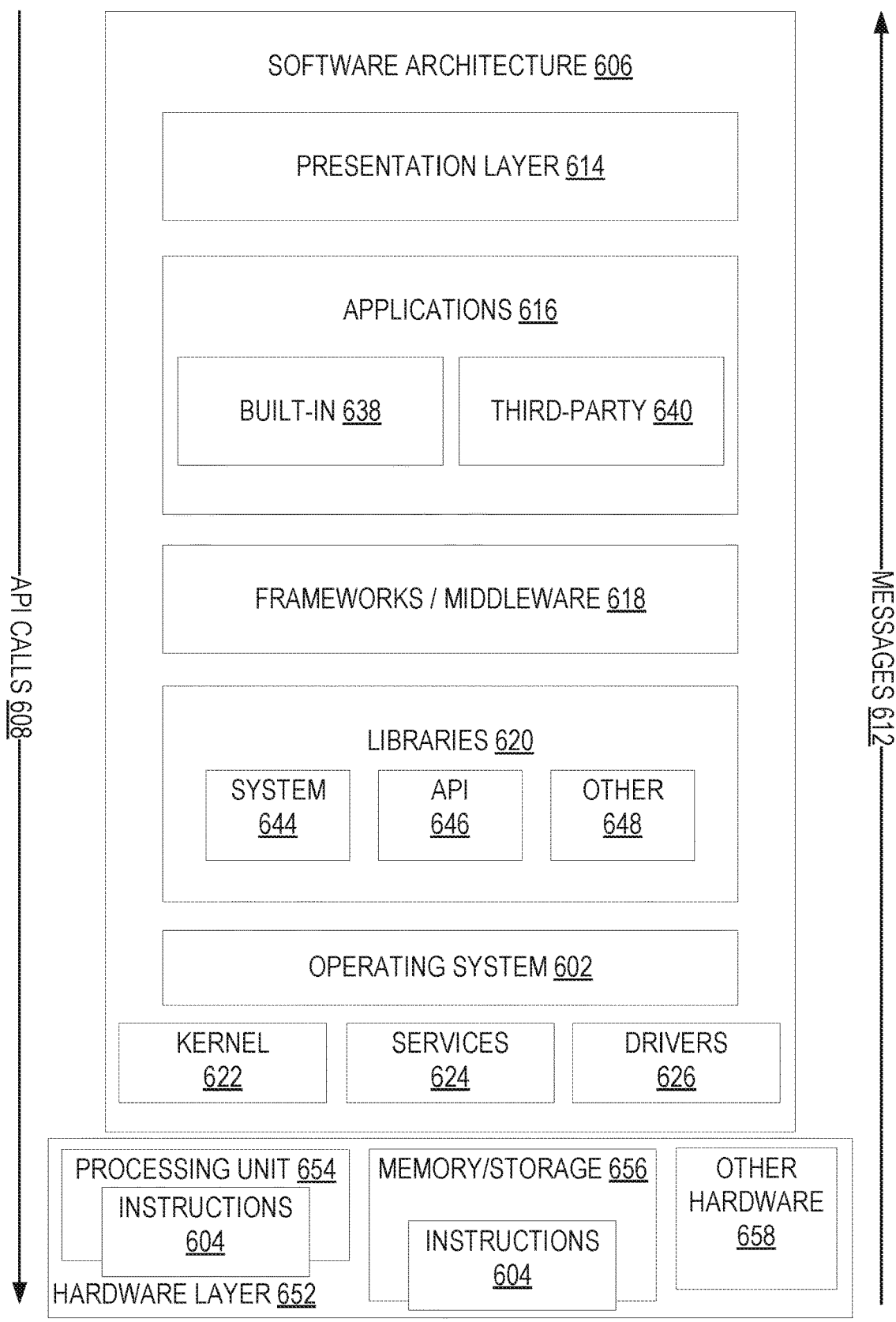
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke Application Programming Interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) divers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
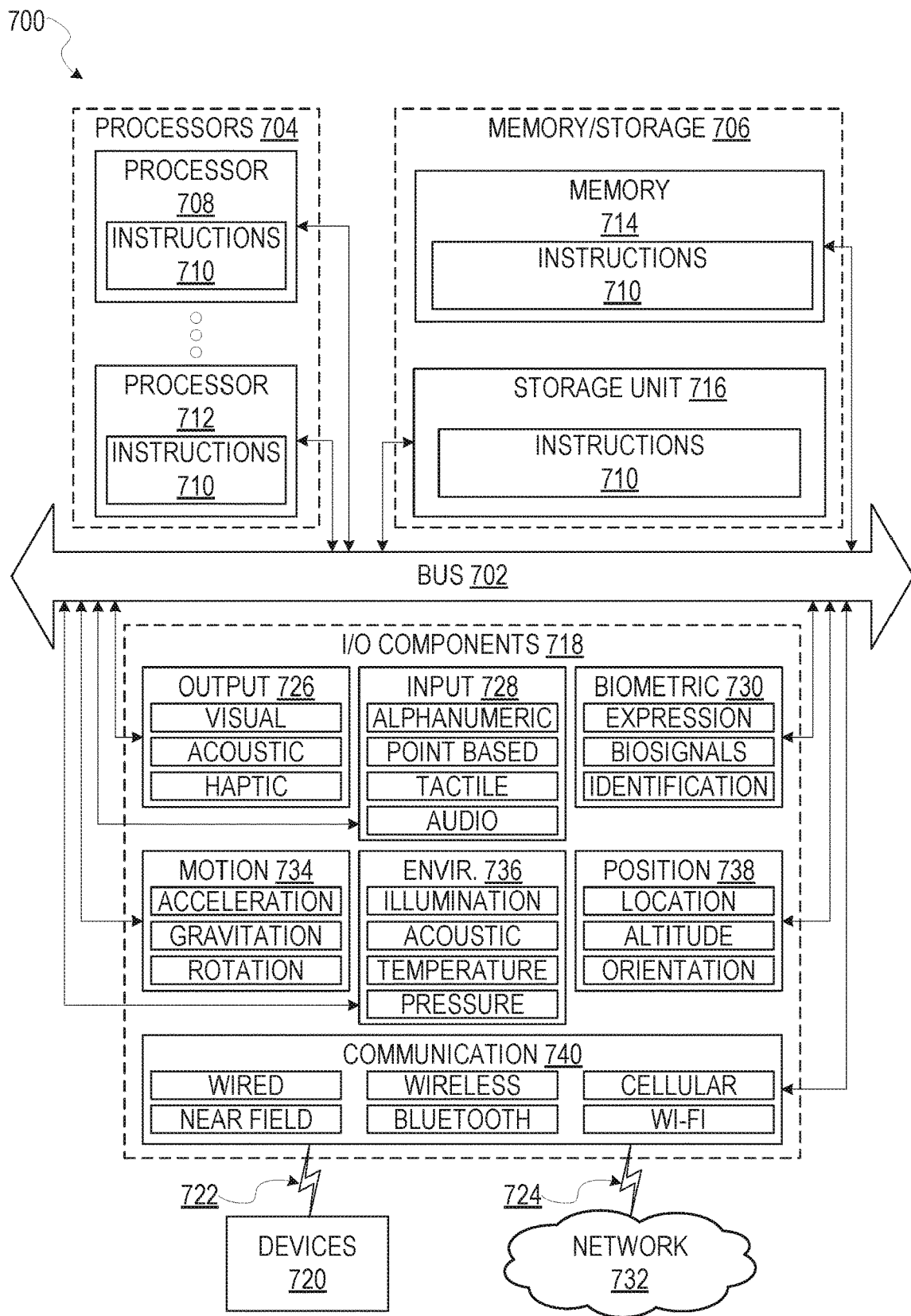
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities.

The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API).

The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 704 (sometimes referred to as "cores") that may execute instructions 710 contemporaneously.

What is claimed is:

1. A method comprising:
obtaining a set of text items associated with a first user, the set of text items including individual text items posted to a feed of an online service;
determining a first subset of text items from the set of text items that includes a first language;
determining a second subset of text items from the set of text items that includes a second language that is different than the first language;
determining, based on a number of text items included in the first subset of text items relative to the number of text items in the set of text items, a first text-based probability score for the first user, the first text-based probability score indicating a level of proficiency of the first user in the first language, wherein each text item in the first subset of text items has a weighted contribution to the first text-based probability score based on a type of interaction the first user had with a respective text item, wherein a weighting factor associated with authoring a text item is greater than a weighting factor associated with selecting, viewing or reading a text item;
determining, based on a number of text items included in the second subset of text items relative to the number of text items in the set of text items, a second text-based probability score for the first user, the second text-based probability score indicating a level of proficiency of the first user in the second language, wherein each text item in the second subset of text items has a weighted contribution to the first text-based probability score based on a type of interaction the first user had with a respective text item, wherein a weighting factor associated with authoring a text item is greater than a weighting factor associated with selecting, viewing or reading a text item;
obtaining, from a user profile of the first user, text-based user profile data, the user profile of the first user being associated with an account of the online service;
determining, based on the text-based user profile data, a first profile-based probability score for the first user, the first profile-based probability score indicating a level of proficiency of the first user in the first language;

determining, based on the text-based user profile data, a second profile-based probability score for the first user, the second profile-based probability score indicating a level of proficiency of the first user in the second language;

determining a first aggregated probability score for the first user based on the first text-based probability score and the first profile-based probability score;

determining a second aggregated probability score for the first user based on the second text-based probability score and the second profile-based probability score;

determining that the first aggregated probability score is greater than the second aggregated probability score; and in response to determining that the first aggregated probability score is greater than the second aggregated probability score, assigning the first language as a primary language of the first user.

2. The method of claim 1, further comprising:
after assigning the first language as the primary language of the first user, selecting a content item in the first language; and
causing the content item to be presented on a client device of the first user.

3. The method of claim 1, further comprising:
after assigning the first language as the primary language of the first user, selecting at least one recommended response in the first language; and
causing the at least one recommended response to be presented on a client device of the first user.

4. The method of claim 1, further comprising:
determining a third text-based probability score for the first user, the third text-based probability score indicating a level of proficiency of the first user in the first language and the second language based on the text associated with the first user;
determining a third profile-based probability score for the first user, the third profile-based probability score indicating a level of proficiency of the first user in the first language and the second language based on the text-based user profile data of the first user; and
determining a third aggregated probability score for the first user based on the third text-based probability score and the third profile-based probability score.

5. The method of claim 4, further comprising:
determining that the third aggregated probability score is greater than the first aggregated probability score; and
in response to determining that the third aggregated probability score is greater than the first aggregated probability score, assigning the second language as a secondary language of the first user.

6. The method of claim 1, wherein the text items in the set of text items associated with the first user include text items authored by the first user and text items selected, viewed, or read by the first user.

7. A system comprising:
one or more computer processors; and
one or more computer-readable mediums storing instructions that, when executed by the one or more computer processors, cause the system to perform operations comprising:
obtaining a set of text items associated with a first user, the set of text items including individual text items posted to a feed of an online service;

determining a first subset of text items from the set of text items that includes a first language;

determining a second subset of text items from the set of text items that includes a second language that is different than the first language;

determining, based on a number of text items included in the first subset of text items relative to a number of text items in the set of text items, a first text-based probability score for the first user, the first text-based probability score indicating a proficiency level of the first user in the first language, each text item in the first subset of text items having a weighted contribution to the first text-based probability score based on a type of interaction that the first user had with the text item, wherein a weighting factor associated with authoring a text item is greater than a weighting factor associated with selecting, viewing or reading a text item;

determining, based on a number of text items included in the second subset of text items relative to the number of text items in the set of text items, a second text-based probability score for the first user, the second text-based probability score indicating a proficiency level of the first user in the second language, each text item in the second subset of text items having a weighted contribution to the second text-based probability score based on a type of interaction that the first user had with the text item, wherein a weighting factor associated with authoring a text item is greater than a weighting factor associated with selecting, viewing or reading a text item;

obtaining, from a user profile of the first user, text-based user profile data, the user profile of the first user being associated with an account of the online service;

determining, based on the text-based user profile data describing the first user, a first profile-based probability score for the first user, the first profile-based probability score indicating a level of proficiency of the first user in the first language;

determining, based on the text-based user profile data, a second profile-based probability score for the first user, the second profile-based probability score indicating a level of proficiency of the first user in the second language;

determining a first aggregated probability score for the first user based on the first text-based probability score and the first profile-based probability score;

determining a second aggregated probability score for the first user based on the second text-based probability score and the second profile-based probability score;

determining that the first aggregated probability score is greater than the second aggregated probability score; and in response to determining that the first aggregated probability score is greater than the second aggregated probability score, assigning the first language as a primary language of the first user.

8. The system of claim 7, the operations further comprising:
after assigning the first language as the primary language of the first user, selecting a content item in the first language; and
causing the content item to be presented on a client device of the first user.

9. The system of claim 7, the operations further comprising:
after assigning the first language as the primary language of the first user, selecting at least one recommended response in the first language; and
causing the at least one recommended response to be presented on a client device of the first user.

10. The system of claim 7, the operations further comprising:
determining a third text-based probability score for the first user, the third text-based probability score indicating a level of proficiency of the first user in the first language and the second language based on the text associated with the first user;
determining a third profile-based probability score for the first user, the third profile-based probability score indicating a level of proficiency of the first user in the first language and the second language based on the text-based user profile data of the first user; and
determining a third aggregated probability score for the first user based on the third text-based probability score and the third profile-based probability score.

11. The system of claim 10, the operations further comprising:
determining that the third aggregated probability score is greater than the first aggregated probability score; and
in response to determining that the third aggregated probability score is greater than the first aggregated probability score, assigning the second language as a secondary language of the first user.

12. The system of claim 7, wherein the text items in the set of text items associated with the first user include text items authored by the first user and text items selected, viewed, or read by the first user.

13. A non-transitory computer-readable medium storing instructions that, when executed by one or more computer processors of a computing system, cause the computing system to perform operations comprising:
obtaining a set of text items associated with a first user, the set of text items including individual text items posted to a feed of an online service;
determining a first subset of text items from the set of text items that includes a first language;
determining a second subset of text items from the set of text items that includes a second language that is different than the first language;
determining, based on a number of text items included in the first subset of text items relative to the number of text items in the set of text items, a first text-based probability score for the first user, the first text-based probability score indicating a level of proficiency of the first user in the first language, each text item in the first subset of text items having a weighted contribution to the first text-based probability score based on a type of interaction that the first user had with the text item, wherein a weighting factor associated with authoring a text item is greater than a weighting factor associated with selecting, viewing or reading a text item;
determining, based on a number of text items included in the second subset of text items relative to the number of text items in the set of text items, a second text-based probability score for the first user, the second text-based probability score indicating a level of proficiency of the first user in the second language based on the set of text items associated with the first user, each text item in the second subset of text items having a weighted contribution to the second text-based probability score based on a type of interaction that the first user had with the text item, wherein a weighting factor associated with authoring a text item is greater than a weighting factor associated with selecting, viewing or reading a text item;
obtaining, from a user profile of the first user, text-based user profile data of the first user from a user profile of the first user, the user profile of the first user being associated with an account of the online service;
determining, based on the text-based user profile data describing the first user, a first profile-based probability score for the first user, the first profile-based probability score indicating a level of proficiency of the first user in the first language;
determining, based on the text-based user profile data describing the first user, a second profile-based probability score for the first user, the second profile-based probability score indicating a level of proficiency of the first user in the second language;
determining a first aggregated probability score for the first user based on the first text-based probability score and the first profile-based probability score;
determining a second aggregated probability score for the first user based on the second text-based probability score and the second profile-based probability score;
determining that the first aggregated probability score is greater than the second aggregated probability score; and
in response to determining that the first aggregated probability score is greater than the second aggregated probability score, assigning the first language as a primary language of the first user.

14. The non-transitory computer-readable medium of claim 13, the operations further comprising:
after assigning the first language as the primary language of the first user, selecting a content item in the first language; and
causing the content item to be presented on a client device of the first user.

15. The non-transitory computer-readable medium of claim 13, the operations further comprising:
after assigning the first language as the primary language of the first user, selecting at least one recommended response in the first language; and
causing the at least one recommended response to be presented on a client device of the first user.

16. The non-transitory computer-readable medium of claim 13, the operations further comprising:
determining a third text-based probability score for the first user, the third text-based probability score indicating a level of proficiency of the first user in the first language and the second language based on the text associated with the first user;
determining a third profile-based probability score for the first user, the third profile-based probability score indicating a level of proficiency of the first user in the first language and the second language based on the text-based user profile data of the first user;
determining a third aggregated probability score for the first user based on the third text-based probability score and the third profile-based probability score;
determining that the third aggregated probability score is greater than the first aggregated probability score; and
in response to determining that the third aggregated probability score is greater than the first aggregated probability score, assigning the second language as a secondary language of the first user.

17. The non-transitory computer-readable medium of claim 13, wherein the text items in the set of text items associated with the first user include text items authored by the first user and text items selected, viewed, or read by the first user.

\* \* \* \* \*